US006742970B2

(12) United States Patent
Oles et al.

(10) Patent No.: US 6,742,970 B2
(45) Date of Patent: Jun. 1, 2004

(54) CUTTING TOOL

(75) Inventors: Edward J. Oles, Ligonier, PA (US); Stephen T. Belsheim, Kingston Springs, TN (US)

(73) Assignee: Kennametal Inc., Latrobe, PA (US)

( * ) Notice: Subject to any disclaimer, the term of this patent is extended or adjusted under 35 U.S.C. 154(b) by 169 days.

(21) Appl. No.: 10/170,277

(22) Filed: Jun. 12, 2002

(65) Prior Publication Data

US 2003/0230182 A1 Dec. 18, 2003

(51) Int. Cl.[7] .................................................. B23B 27/20
(52) U.S. Cl. ....................................... 407/113; 407/119
(58) Field of Search .................................. 407/119, 118, 407/113, 114, 116; 29/411, 412, 414, 417

(56) References Cited

U.S. PATENT DOCUMENTS

| 5,178,645 | A | | 1/1993 | Nakamura et al. | |
|---|---|---|---|---|---|
| 5,639,285 | A | | 6/1997 | Yao et al. ....................... | 51/307 |
| 5,722,803 | A | | 3/1998 | Battaglia et al. ............. | 407/119 |
| 5,776,552 | A | | 7/1998 | Tanabe et al. ............... | 427/577 |
| 5,791,831 | A | * | 8/1998 | Shimano et al. ............. | 407/113 |
| 5,830,813 | A | | 11/1998 | Yao et al. ....................... | 501/87 |
| 5,861,135 | A | | 1/1999 | Tanabe et al. ............... | 423/446 |
| 5,924,824 | A | * | 7/1999 | Satran et al. .................. | 407/34 |
| 5,944,462 | A | | 8/1999 | Woodward .................... | 409/74 |
| 6,117,533 | A | | 9/2000 | Inspektor ..................... | 428/216 |
| 6,161,990 | A | | 12/2000 | Oles et al. .................... | 407/119 |
| 6,315,502 | B1 | * | 11/2001 | Maurer ........................ | 407/119 |
| 6,331,497 | B1 | | 12/2001 | Collier et al. ............... | 501/96.4 |
| 6,344,149 | B1 | | 2/2002 | Oles ............................ | 216/11 |

FOREIGN PATENT DOCUMENTS

| DE | 1 552 488 | 3/1965 |
|---|---|---|
| EP | 0 362 505 | 4/1990 |
| EP | 0 480 394 A2 | 4/1992 |

OTHER PUBLICATIONS

PCT /US 03/17481, Notice of transmittal of Int'l Search Report or the Declaration (3 pages) Mailing date: Apr. 9, 2003.
PCT/US 03/17481, Filing date: Apr. 6, 2003, International Search Report (3 pages).

* cited by examiner

Primary Examiner—Willmon Fridie, Jr.
(74) Attorney, Agent, or Firm—John J. Prizzi

(57) ABSTRACT

A cutting tool for removing material from a workpiece wherein the cutting tool is held in a pocket of a tool holder. The cutting tool includes a cutting tool substrate with a rake surface and flank surfaces, as well as a notch at the intersection of a pair of adjacent ones of the flank surfaces. The substrate includes opposite flank surfaces that are opposite from the notch and are disposed at a substrate disposition angle with respect to the rake surface of the cutting tool substrate. The cutting tool further includes a cutting blank that is within the notch. The cutting blank has a rake surface and a pair of exposed flank surfaces wherein a cutting edge is at the intersection of the rake surface and the exposed flank surfaces. The exposed flank surfaces of the cutting blank are disposed at a cutting clearance angle with respect to the rake surface of the cutting blank. The cutting clearance angle is not equal to the substrate disposition angle.

47 Claims, 5 Drawing Sheets

CUTTING TOOL

FIELD OF THE INVENTION

The invention pertains to a cutting tool for removing material from a workpiece wherein the cutting tool is held in a pocket of a tool holder. More specifically, the invention pertains to such a cutting tool that has a hard material cutting blank wherein the hard material comprises, for example, polycrystalline diamond (PCD) or polycrystalline cubic boron nitride (PcBN) or CVD diamond sheet. The cutting blank defines a cutting edge.

BACKGROUND OF THE INVENTION

In metal working (e.g., turning, milling, and boring applications) a cutting tool is received and held in a pocket of a tool holder to form a cutting assembly. In some cases, the cutting tool comprises a substrate that receives a cutting blank comprising either polycrystalline diamond or polycrystalline cubic boron nitride or CVD diamond sheet. The cutting blank defines the cutting edge.

In operation, the cutting edge contacts the workpiece and a part of the workpiece is generally removed in the form of a chip, a coil or a stringer of metal. At a point just prior to the metal being cut, i.e., at a point where the workpiece initially contacts the cutting edge, the workpiece material becomes compressed. This is especially the case with respect to a metal like either aluminum or an aluminum alloy.

At the time of being cut, the cut workpiece material is under compression and thereby tends to expand as it exits the cutting zone. The expansion of the workpiece material occurs so that the expanding workpiece rubs against the flank surface(s) that define (at least in part) the cutting edge. This contact between the workpiece material and the flank surface(s) causes abrasive wear and contributes to shortening the useful life of the cutting tool.

It thus becomes apparent that it would be desirable to provide a cutting tool that reduces the extent to which the workpiece material abrasively wears against the flank surface(s) upon exiting the cutting zone.

In the past, one style of cutting tool presented a substrate that held via brazing a cutting blank (e.g., comprising either PCD or PcBN). The cutting blank had flank surfaces that defined (at least in part) the cutting edge. The substrate had exposed flank surfaces and opposite flank surface(s). These flank surfaces were disposed at an angle with respect a vertical plane thereby defining a clearance angle. For these cutting tools, the clearance angle has been the same for each one of the flank surfaces of the substrate and the cutting blank. The disadvantage of this is that different tool holders are necessary to receive cutting tools that have different clearance angles.

For a number of reasons it would be desirable to provide cutting tools that exhibits different clearance angles and that can be received by the same tool holder.

SUMMARY OF THE INVENTION

In one form, the invention is a cutting tool for removing material from a workpiece wherein the cutting tool is held in a pocket of a tool holder. The cutting tool comprises a cutting tool substrate that has a rake substrate surface and a plurality of flank substrate surfaces. The cutting tool substrate contains a notch and the notch is at the intersection of a pair of adjacent flank substrate surfaces. The substrate has an opposite corner defined by the flank substrate surfaces that are opposite from the notch. The adjacent flank substrate surfaces are disposed at a substrate clearance angle with respect to the normal to the rake substrate surface. The opposite flank substrate surfaces are disposed at a substrate disposition angle with respect to the normal to the rake substrate surface. The opposite flank substrate surfaces contact a portion of the tool holder that at least in part defines the pocket. The cutting tool further includes a cutting blank that is received within the notch. The cutting blank has a rake blank surface and a pair of flank blank surfaces wherein a cutting edge is at the intersection of the rake blank surface and the flank blank surfaces. The flank blank surfaces are disposed at a cutting clearance angle with respect to the normal to the rake blank surface. The substrate clearance angle is equal to the cutting clearance angle. The cutting clearance angle is not equal to the substrate disposition angle.

In yet another form, the invention is a cutting tool assembly for removing material from a workpiece. The cutting tool assembly comprises a tool holder that contains a pocket wherein a rear surface and a bottom surface define the pocket, and a cutting tool is received within the pocket of the tool holder. The cutting tool comprises a cutting tool substrate that has a rake substrate surface and a plurality of flank substrate surfaces. The cutting tool substrate contains a notch and the notch is at the intersection of a pair of adjacent flank substrate surfaces. The substrate has an opposite corner defined by flank substrate surfaces that are opposite from the notch. The adjacent flank substrate surfaces are disposed at a substrate clearance angle with respect to the normal to the rake substrate surface. The opposite flank substrate surfaces are disposed at a substrate disposition angle with respect to the normal to the rake substrate surface. The opposite flank substrate surfaces contact a portion of the tool holder that at least in part defines the pocket. The cutting tool further includes a cutting blank received within the notch wherein the cutting blank has a rake blank surface and a pair of flank blank surfaces. A cutting edge is at the intersection of the rake blank surface and the flank blank surfaces. The flank blank surfaces are disposed at a cutting clearance angle with respect to the normal to the rake flank surface. The substrate clearance angle is equal to the cutting clearance angle. The cutting clearance angle is not equal to the substrate disposition angle.

In still another form thereof, the invention is a cutting tool for removing material from a workpiece wherein the cutting tool is held in a pocket of a tool holder. The cutting tool comprises a cutting tool substrate that has a rake substrate surface and a plurality of flank substrate surfaces including a pair of adjacent flank substrate surfaces. Each one of the adjacent flank substrate surfaces has a forward portion and a rearward portion. The cutting tool substrate contains a notch at the intersection of the forward portions of the adjacent flank substrate surfaces. The substrate has an opposite corner defined by opposite flank substrate surfaces that are opposite from the notch. The forward portions of the adjacent flank substrate surfaces are disposed at a substrate clearance angle with respect to the normal to the rake substrate surface. The rearward portions of the adjacent flank substrate surfaces and the opposite flank substrate surfaces are disposed at a disposition angle with respect to the normal to the rake substrate surface. The cutting tool further includes a cutting blank that is received within the notch wherein the cutting blank has a rake blank surface and a pair of flank blank surfaces. A cutting edge is at the intersection of the rake blank surface and the flank blank surfaces. The flank blank surfaces are disposed at a cutting clearance angle with respect to the normal to the rake blank surface. The substrate clearance angle is equal to the cutting clearance angle. The cutting clearance angle is not equal to the disposition angle.

In still another form thereof, the invention is a cutting tool for removing material from a workpiece wherein the cutting tool is held in a pocket of a tool holder. The cutting tool comprises a cutting tool substrate that has a rake substrate surface, adjacent flank substrate surfaces, and an opposite flank substrate surface. Each one of the adjacent flank substrate surfaces has a forward portion and a rearward portion. The cutting tool substrate contains a notch at the intersection of the forward portions of the adjacent flank substrate surfaces. The forward portions of the adjacent flank substrate surfaces are disposed at a substrate clearance angle with respect to the normal to the rake substrate surface. The rearward portions of the adjacent flank substrate surfaces and the opposite flank substrate surface are disposed at a disposition angle with respect to the normal to the rake substrate surface. The cutting tool further includes a cutting blank that is received within the notch. The cutting blank has a rake blank surface and a pair of adjacent flank blank surfaces and a cutting edge is at the intersection of the rake blank surface and at least one of the adjacent flank surfaces. The flank blank surfaces are disposed at a cutting clearance angle with respect to the normal to the rake blank surface. The cutting clearance angle is equal to the substrate clearance angle. The cutting clearance angle is not equal to the disposition angle.

In another form thereof, the invention is a cutting tool for removing material from a workpiece wherein the cutting tool is held in a pocket of a tool holder. The cutting tool comprises a cutting tool substrate that has a rake substrate surface, adjacent flank substrate surfaces, and an opposite flank substrate surface. One of the adjacent flank substrate surfaces has a forward portion and a rearward portion. The cutting tool substrate contains a notch at the intersection of the forward portion of the one adjacent flank substrate surface and the other adjacent flank substrate surface. The forward portion of the one adjacent flank substrate surface is disposed at a substrate clearance angle with respect to the normal to the rake substrate surface. The rearward portion of the one adjacent flank substrate surface and the other adjacent flank substrate surface and the opposite flank substrate surface are disposed at a disposition angle with respect to the normal to the rake substrate surface. The cutting tool further contains a cutting blank is received within the notch wherein the cutting blank has a rake blank surface and a pair of adjacent flank blank surfaces and a cutting edge is at the intersection of the rake blank surface and one of the adjacent flank surfaces. The one adjacent flank blank surface is disposed at a cutting clearance angle with respect to the normal to the rake blank surface. The cutting clearance angle is equal to the substrate clearance angle. The cutting clearance angle is not equal to the disposition angle.

In still another form thereof, the invention is a cutting tool for removing material from a workpiece wherein the cutting tool is held in a pocket of a tool holder. The cutting tool comprises a cutting tool substrate that has a rake substrate surface, adjacent flank substrate surfaces, and an opposite flank substrate surface. The cutting tool substrate contains a notch at the intersection of the forward portions of the adjacent flank substrate surfaces. One of the adjacent flank substrate surfaces is disposed at a substrate clearance angle with respect to the normal to the rake substrate surface, and the other one of the adjacent flank substrate surfaces and the opposite flank substrate surface are disposed at a disposition angle with respect to the normal to the rake substrate surface. The cutting tool also includes a cutting blank that is received within the notch. The cutting blank has a rake blank surface and a pair of adjacent flank blank surfaces, and a cutting edge is at the intersection of the rake blank surface and one of the adjacent flank blank surfaces. The one flank blank surface is disposed at a cutting clearance angle with respect to the normal to the rake blank surface, and the cutting clearance angle is equal to the substrate clearance angle. The cutting clearance angle is not equal to the disposition angle.

BRIEF DESCRIPTION OF THE DRAWINGS

The following is a brief description of the drawings wherein these drawings form a part of this patent application.

DETAILED DESCRIPTION OF THE INVENTION

Figure 1:
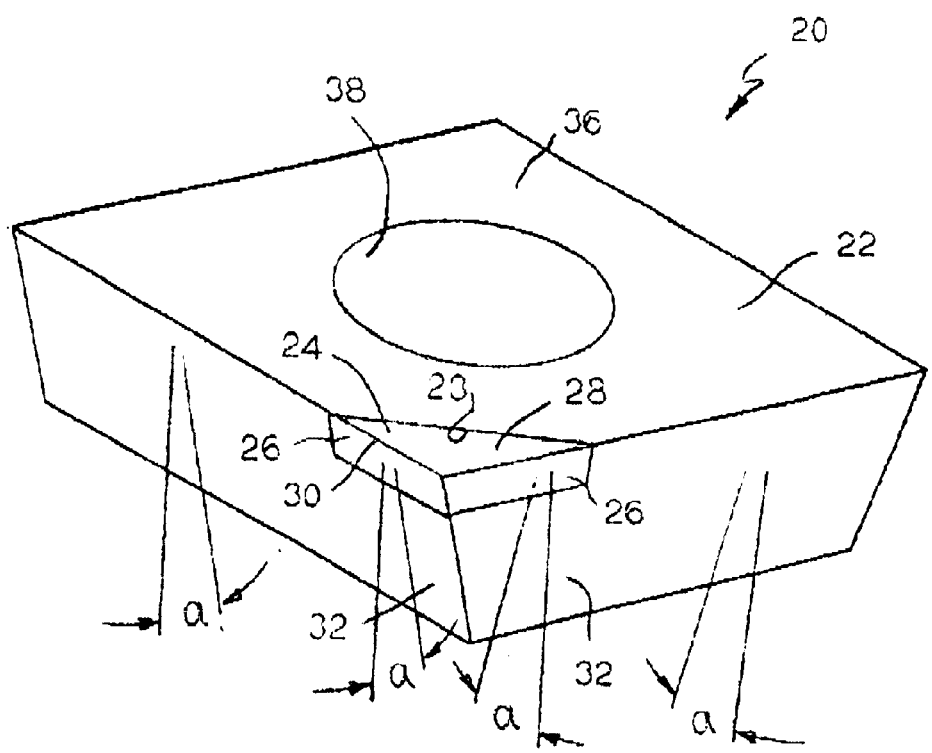
FIG. 1 is an isometric view taken from one direction of a specific embodiment of a cutting tool that has a substrate that receives a cutting blank and wherein the flank surfaces of the cutting blank that along with the rake surfaces define the cutting edge are disposed at a cutting clearance angle with respect to the normal to the rake surface of the cutting blank.
Figure 2:
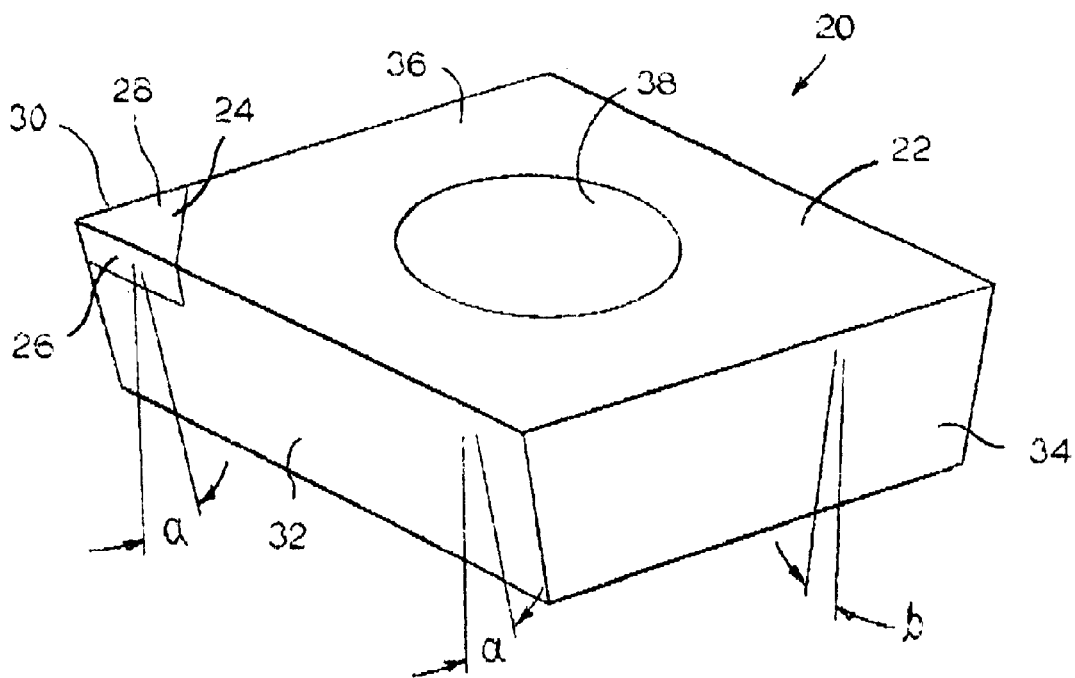
FIG. 2 is an isometric view of the cutting tool shown in FIG. 1 taken from another direction so as to show one of the flank surfaces of the cutting blank that along with the rake surface defines the cutting edge and one of the opposite flank surfaces of the substrate that contacts one of the rear walls of the tool holder and wherein the opposite flank surfaces of the substrate are disposed at a disposition angle with respect to the normal to the rake surface of the substrate.

Referring to FIGS. 1 and 2, there is shown a first specific embodiment of a cutting tool generally designated as 20. Cutting tool 20 presents a cutting tool substrate 22 that contains a notch 23 to receive a polycrystalline diamond (PCD) cutting blank 24. The PCD cutting blank 24 has a pair of exposed flank surfaces 26 and a rake surface 28. The flank surfaces 26 and the rake surface 28 intersect to form a cutting edge 30. PCD blanks are shown and described in U.S. Pat. No. 6,161,990 to Oles et al. which issued on Dec. 19, 2000 and is entitled CUTTING INSERT WITH IMPROVED FLANK SURFACE ROUGHNESS AND METHOD OF MAKING THE SAME and U.S. Pat. No. 5,722,803 to Battaglia et al. which issued on Mar. 3, 1998 and is entitled CUTTING TOOL AND METHOD OF MAKING THE CUTTING TOOL, and wherein these patents are hereby incorporated by reference herein.

The substrate 22 includes a first pair of adjacent flank surfaces 32. The notch 23 is at the intersection of these flank surfaces 32. The substrate 22 further includes a second pair of opposite flank surfaces 34 (see FIG. 2), as well as a rake surface 36. The rake surface 28 of the cutting blank 24 is coplanar with the rake surface 36 of the substrate 22. The flank surfaces 34 are opposite from the notch 23. There may optionally be a central aperture 38 contained in the substrate 22.

Flank surfaces 32 of the substrate 22 and the flank surfaces 26 of the PCD cutting blank 24 are coplanar with each other, and each are disposed at a cutting clearance angle "a" with respect to the normal to the rake surface 28 of the PCD blank 24 (and the rake surface 36 of the substrate 22). Cutting clearance angle "a" is equal to about 20 degrees. The opposite flank surfaces 34 are each disposed at a disposition angle "b" with respect to the normal of the rake surface 28 of the cutting blank 24 (and the rake surface 36 of the substrate 22). Disposition angle "b" is equal to about 11 degrees. It can thus be appreciated that cutting clearance angle "a" and disposition angle "b" are not equal to each other. In this case, cutting clearance angle "a" of the cutting blank is greater than disposition angle "b" of the opposite flank surfaces 34 of the substrate. More specifically, cutting clearance angle "a" is equal to about 181.8 percent (20/11) of the disposition angle "b".

Figure 3:
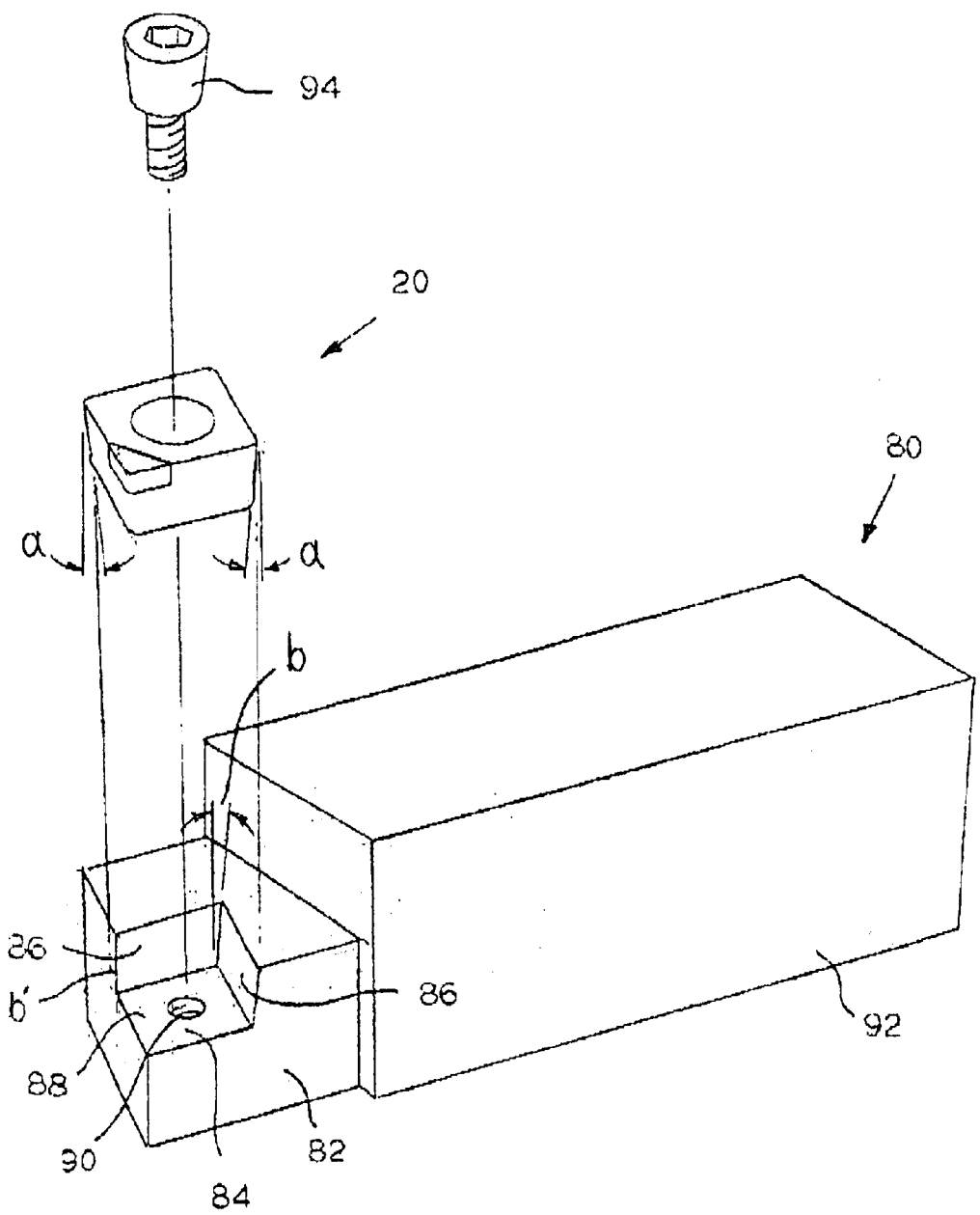
FIG. 3 is an isometric view of the cutting tool shown in FIG. 1 wherein the cutting tool is exploded away from the pocket of a tool holder, and wherein in operation the pocket of the tool holder receives and holds the cutting tool.

Referring to FIG. 3, there is shown a tool holder generally designated as 80. Cutting tool 20 is shown exploded away from the tool holder 80. Tool holder 80 has a head 82 that contains a pocket 84.

The pocket 84 is defined by a pair of rear surfaces 86 and a bottom surface 88. The rear surfaces 86 are disposed at an angle "b¹" with respect to a plane that is perpendicular to the bottom surface 88 of the pocket 84. There is an aperture 90 contained in the bottom surface 88 of the pocket 84. The tool holder 80 further has a shank 92.

When the cutting tool is assembled to the tool holder 80, cutting tool 20 is received within the pocket 84. The opposite flank surfaces 34 of the substrate 22 are in contact with the rear surfaces 86 of the tool holder 80. The angles "b" and "b¹" complement each other so that the cutting tool 20 rests securely within the pocket of the tool holder. A locking screw 94 passes through the aperture 38 in the cutting tool substrate 22 and into the aperture 90. The screw 94 is tightened thereby retaining the cutting tool 20 within the pocket 84 of the tool holder 80.

Figure 4:
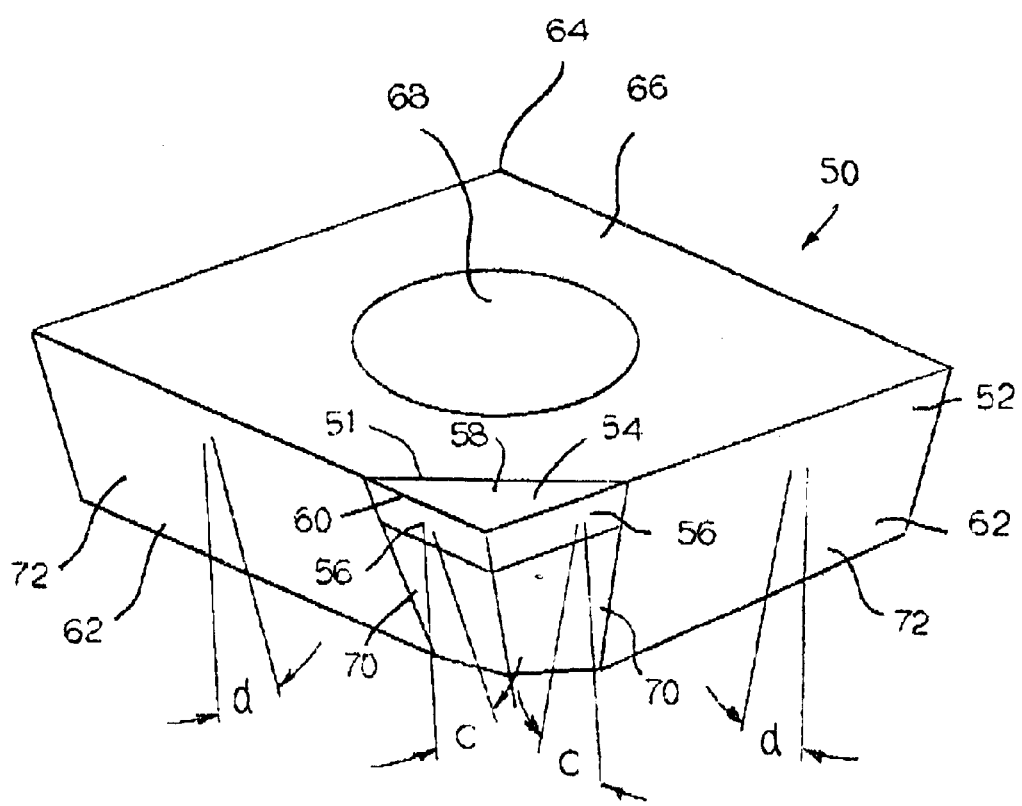
FIG. 4 is an isometric view taken from one direction of another specific embodiment of a cutting tool that has a substrate that receives a cutting blank and wherein the flank surfaces of the cutting blank that along with the rake surface define the cutting edge are disposed at a clearance angle with respect to the normal to the rake surface of the cutting blank.

FIG. 4 is an isometric view that illustrates a second specific embodiment of a cutting tool generally designated as 50. Cutting tool 50 presents a cutting tool substrate 52 that contains a notch 51 to receive a polycrystalline cubic boron nitride (PcBN) blank 54. The PcBN blank 54 has a pair of exposed flank surfaces 56 and a rake surface 58. The exposed flank surfaces 56 intersect with the rake surface 58 to form a cutting edge 60. PcBN cutting inserts are shown and described in U.S. Pat. No. 5,639,285 to Yao et al. issued on Jun. 17, 1997 and entitled Polycrystalline Cubic Boron Nitride Cutting Tool, U.S. Pat. No. 5,830,813 to Yao et al. issued on Nov. 3, 1998 and entitled Method of Making a Polycrystalline Cubic Boron Nitride Cutting Tool, and wherein these patents are hereby incorporated by reference herein.

It should be appreciated that the PcBN blank may be coated with a hard material via chemical vapor deposition (CVD) or physical vapor deposition (PVD). More preferably, the deposition technique to apply the coating is PVD. Most preferably, the coating on the PcBN blank is a PVD-applied titanium aluminum nitride. In this regard, U.S. patent application Ser. No. 09/571,695 (filed on May 15, 2000) to Oles et al for COATED PcBN CUTTING INSERTS discloses and describes coating of polycrystalline cubic boron nitride with an aluminum-containing coating layer (e.g., titanium aluminum nitride and/or aluminum oxide), and this patent application is hereby incorporated by reference herein.

The substrate 52 includes a pair of adjacent flank surfaces 62. The notch 51 is at the intersection of flank surfaces 62. The substrate 52 further includes a pair of opposite flank surfaces (not illustrated) that intersect to form a corner 64 opposite the notch 51. The substrate 52 further presents a rake surface 66. The substrate 22 may optionally contain a central aperture 68 therein.

Each one of the flank surfaces 62 has a forward portion 70 and a rearward portion 72. The forward portions 70 intersect so that the notch 51 is at this intersection. The length of the forward portion 70 of substrate 52 is equal to or greater than the length of the flank surface 56 of the PcBN blank 54. The flank surfaces 56 of the PcBN blank 54 are coplanar with the corresponding forward portion 70 of the flank surface 62 of the substrate 52. Flank surfaces 56 (as well as forward portions 70) are each disposed at a cutting clearance angle "c" with respect to the normal to the rake surface 58 of the blank 54. In this specific embodiment, cutting clearance angle "c" is equal to about 15 degrees.

The rearward portions 72 of flank surfaces 62 and each one of the opposite flank surfaces of the substrate 52 are disposed at a disposition angle "d" with respect to the normal to the rake surface 66 of the substrate 52. Disposition angle "d" is equal to about 11 degrees. It can thus be appreciated that cutting clearance angle "c" and the disposition angle "d" are not equal in magnitude. In this case, cutting clearance angle "c" is greater than disposition angle "d". More specifically, cutting clearance angle "c" is equal to about 136.4 percent (15/11) of the disposition angle "d".

Figure 5:
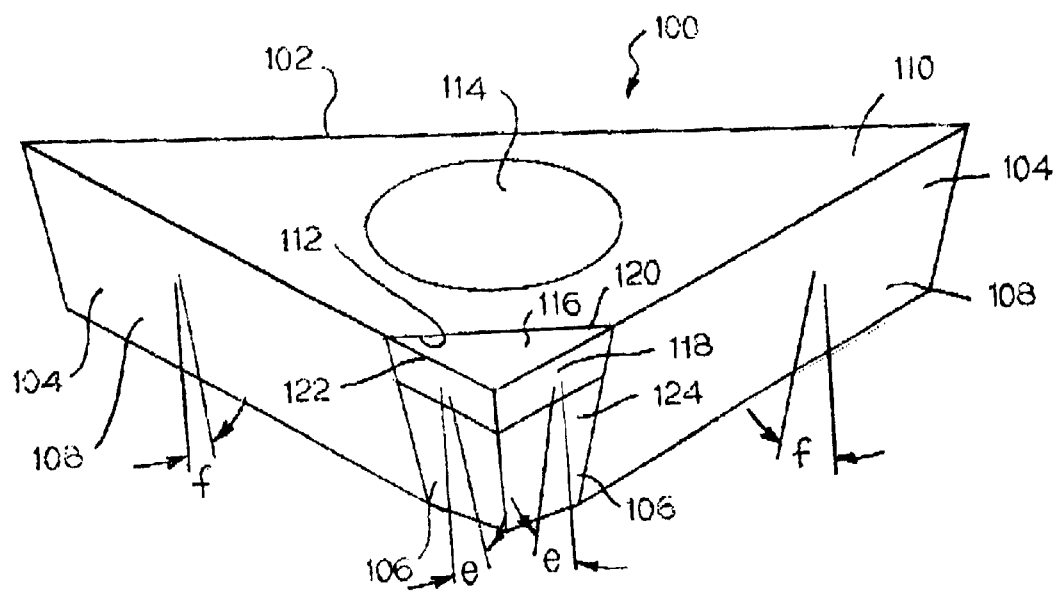
FIG. 5 is an isometric view taken of a specific embodiment of a triangularly-shaped cutting tool that has a substrate that receives a cutting blank wherein the blank has flank surfaces that along with the rake surface define the cutting edge and wherein these flank surfaces are disposed at a clearance angle with respect to the rake surface of the cutting blank.

Referring to FIG. 5, there is shown another specific embodiment of a cutting tool generally designated as 100. Cutting tool 100 has a generally triangular shape. Cutting tool 100 presents a substrate 102 that has exposed flank surfaces 104. Each exposed flank surface 104 has a forward portion 106 and a rearward portion 108. Substrate 102 has a rake surface 110. A notch 112 is at the intersection of the forward portions 106 of the flank surfaces 104. An opposite flank surface (not illustrated) is opposite the notch 112. Substrate 102 optionally contains an aperture 114.

Cutting tool 100 further includes a PCD blank 116. PCD blank 116 has flank surfaces 118 and a rake surface 120. The rake surface 120 intersects with the flank surfaces 118 to form a cutting edge 122. Each of the flank surfaces 118 of the PCD blank 116 is coplanar with its corresponding forward portion 106 of the flank surfaces 104 of the substrate 102. The rake surface 120 of the PCD blank 116 is coplanar with the rake surface 110 of the substrate 102.

Each one of the flank surfaces 118 of the PCD blank 116, as well as each one of the forward portions of the flank surfaces 104 of substrate 102, is disposed at a cutting clearance angle "e" with respect to the normal to the rake blank surface 120.

The rearward portions 108 of flank surfaces 104 and the opposite flank surface of the substrate 102 are disposed at a disposition angle "f" with respect to the normal to the rake surface 110 of the substrate 102. The disposition angle "f" is equal to about 11 degrees and the cutting clearance angle "e" is equal to about 20 degrees. In light of the difference between theses angles "e" and "f", there is a shoulder 124 that is at the juncture of the forward portion 106 and the rearward portion 108 of each one of the flank surfaces 104.

Figure 6:
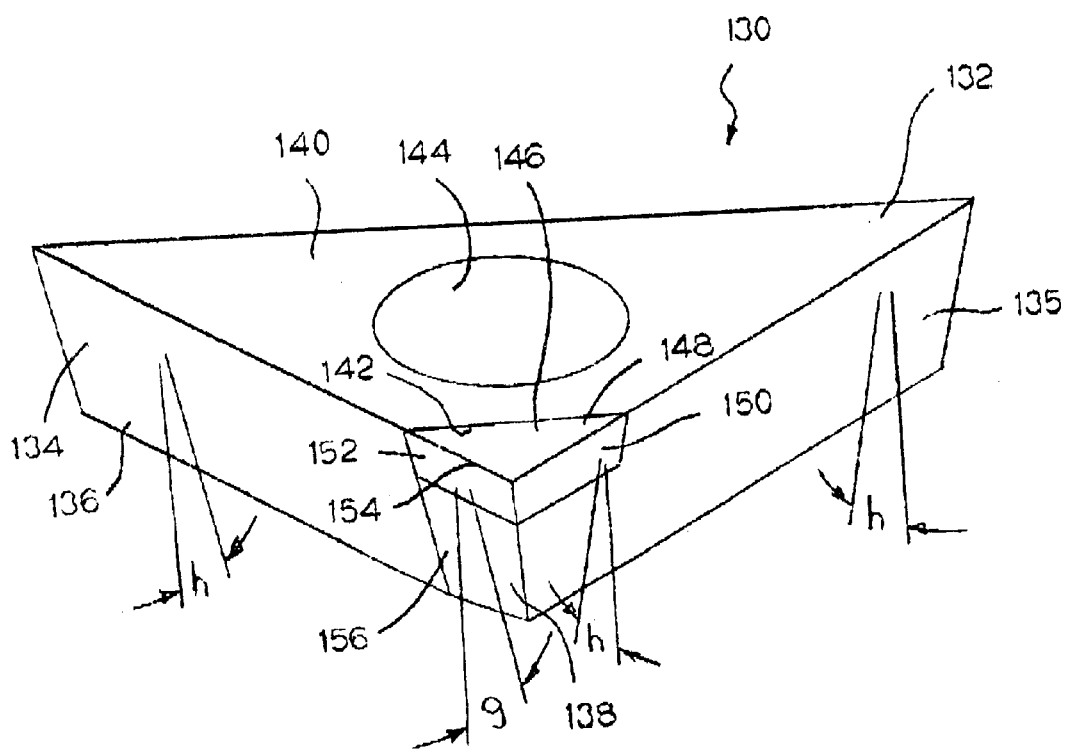
FIG. 6 is an isometric view of another specific embodiment of a triangularly-shaped cutting tool that has a substrate that receives a cutting blank wherein the blank has a flank surface that along with the rake surface defines the cutting edge, and wherein the flank surface is disposed at a cutting clearance angle with respect to the normal of the rake surface of the cutting blank.

Referring to FIG. 6, there is shown another specific embodiment of a cutting tool generally designated as 130. Cutting tool 130 has a generally triangular shape. Cutting tool 130 presents a substrate 132 that has exposed flank surfaces 134 and 135. One of the exposed flank surfaces 134 has a forward portion 138 and a rearward portion 136. Substrate 132 has a rake surface 140. A notch 142 is at the intersection of the exposed flank surfaces 134 and 135. An opposite flank surface (not illustrated) is opposite the notch 142. Substrate 132 optionally contains an aperture 144.

Cutting tool 130 further includes a CVD diamond sheet cutting blank 146. CVD diamond sheet is disclosed in U.S. Pat. No. 5,861,135 to Tanabe et al. issued on Jan. 19, 1999 and entitled HIGHLY CRYSTALLINE DIAMOND SHEET and U.S. Pat. No. 5,776,552 to Tanabe et al. issued on Jul. 7, 1998 and entitled PROCESS FOR THE VAPOR PHASE SYNTHESIS OF DIAMOND AND HIGHLY CRYSTALLINE DIAMOND, hereby incorporated by reference herein. Cutting blank 146 has flank surfaces 150 and 152. CVD diamond sheet blank 146 has a rake surface 148. The rake surface 148 intersects with the flank surface 152 to form a cutting edge 154.

Flank surface 152 of the cutting blank 146 and the forward portion 138 of the flank surface 134 of the substrate 132 are coplanar and each are disposed at a cutting clearance angle "g" with respect to the normal to the rake blank surface 148.

The rearward portion 136 of flank surface 134, the entire flank surface 135 and the opposite flank surface of the substrate 132 are disposed at a disposition angle "h" with respect to the normal to the rake surface 140 of the substrate 132. Flank surface 150 of cutting blank 146 is coplanar with flank surfaces 135 of the substrate 132 so as to also be disposed at disposition angle "h". The disposition angle "h" is equal to about 11 degrees. The cutting clearance angle "g" is equal to about 20 degrees. In light of the difference between theses angles "g" and "h", there is a shoulder 156 that is at the juncture of the forward portion 138 and the rearward portion 136 of flank surface 134.

It should be appreciated that even though cutting tool 130 is shown as a left-handed cutting tool, applicants contemplate that the geometry of the cutting tool could be such so as to be a right-handed cutting tool.

Figure 7:
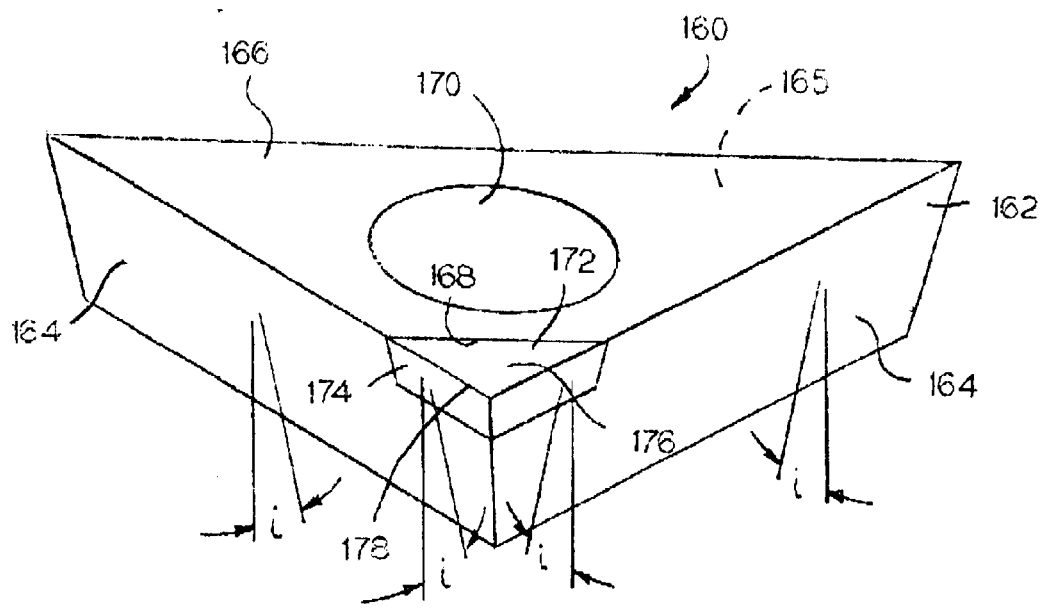
FIG. 7 is an isometric view of another specific embodiment of a triangularly-shaped cutting tool that has a substrate that receives a cutting blank wherein the blank has flank surfaces that along with the rake surface defines the cutting edge, and wherein the flank surfaces are disposed at a cutting clearance angle with respect to the normal of the rake surface of the cutting blank.

Referring to FIG. 7, there is shown another specific embodiment of a cutting tool generally designated as 160. Cutting tool 160 has a generally triangular shape. Cutting tool 160 presents a substrate 162 that has exposed flank surfaces 164. Substrate 162 has a rake surface 166. A notch 168 is at the intersection of the flank surfaces 164. An opposite flank surface 165 (shown with a dashed line) is opposite the notch 168. Substrate 162 optionally contains an aperture 170.

Cutting tool 160 further includes a PCD blank 172. PCD blank 172 has flank surfaces 174 and a rake surface 176. The rake surface 176 intersects with the flank surfaces 174 to form a cutting edge 178.

Flank surfaces 174 of the PCD blank 172 are coplanar with the corresponding flank surfaces 164 of the substrate 162. Flank surfaces 174 (as well as flank surfaces 164) are disposed at a cutting clearance angle "i" with respect to the normal to the rake surface 176 of the PCD blank 172.

The opposite flank surface 165 is disposed at a disposition angle with respect to the normal to the rake surface 166 of the substrate 162. The disposition angle is equal to about 11 degrees and the cutting clearance angle "i" is equal to about 20 degrees.

The embodiments of the cutting tools shown in FIGS. 5, 6, and 7 are triangularly-shaped cutting tools. In operation, these cutting tools are held in the pocket of a tool holder such that the opposite flank surface and most of one of the other flank surfaces contact rear walls that define (in part) the pocket. A locking screw passes through the aperture contained in the bottom surface of the pocket.

Figure 8:
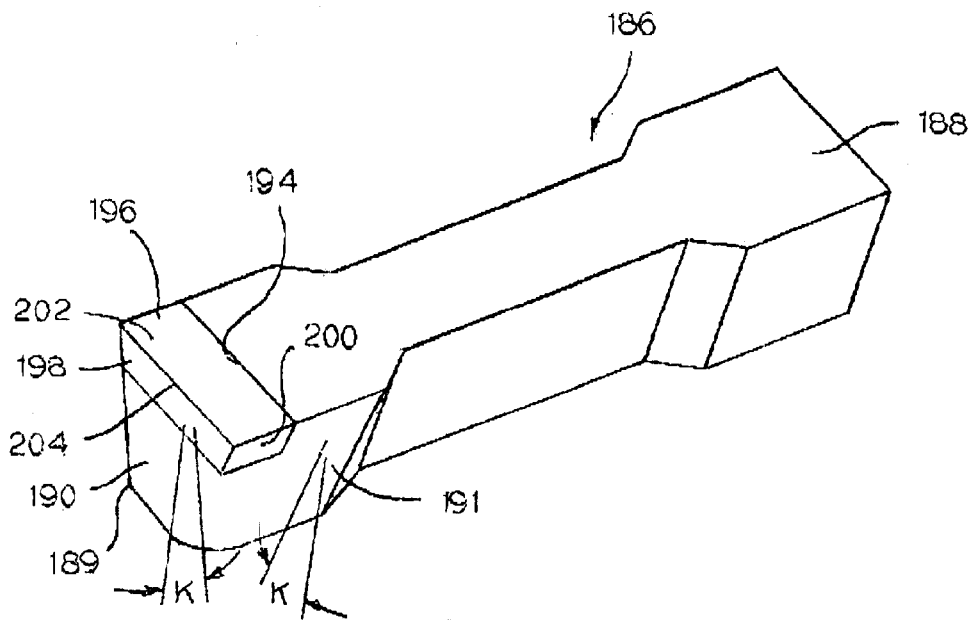
FIG. 8 is an isometric view of a grooving tool that has a body that receives a cutting blank wherein the blank has a flank surface that together with the rake surface defines the cutting edge and the flank surface being disposed as a cutting clearance angle with respect to the normal of the rake surface of the cutting blank.

Referring to FIG. 8, there is shown a grooving tool generally designated as 186. Grooving tool 186 has a substrate 188 that has a forward end 189. Forward end 189 has a forward surface 190 and a side surface 191. The forward end 189 contains a notch 194 that receives a PCD blank 196. The PCD blank 196 has flank surfaces 198 and 200 and a rake surface 202. The flank surface 198 is disposed at an angle "k" with respect to the normal of the rake surface 202. The flank surface 198 and the rake surface 202 intersect to form a cutting edge 204.

Referring to the operation of earlier cutting tools wherein the cutting tool comprised a substrate with a notch that retained a cutting blank, the cutting edge was defined by flank surfaces and the rake surface of the cutting blank. The substrate also had flank surfaces. Each one of the flank surfaces of the cutting blank and the substrate was disposed at a clearance angle of about 11 degrees with respect to the rake surface of the cutting blank. The cutting edge contacted the workpiece and a part of the workpiece was removed in the form of, for example, metal chips. At a point just prior to the metal being cut, i.e., at a point where the workpiece approached the cutting edge, the workpiece material becomes compressed. This was especially the case with respect to a metal like aluminum or an aluminum alloy.

As the workpiece exited the cutting zone, it was under compression and thereby tended to expand. The expansion of the workpiece caused it to rub against the flank surfaces that defined the cutting edge. This contact between the workpiece material and the flank surfaces caused abrasive wear of the flank surfaces and contributed to shortening the useful life of the cutting tool.

Applicant has found that the result of increasing the magnitude of the cutting clearance angle from about 11 degrees to either about 20 degrees or about 15 degrees, there is an increase in the useful life of the cutting tool. While applicant does not intend to be bound by any theory or explanation of the reason(s) for this improvement, applicant believes that an increase in the cutting clearance angle results in providing the workpiece material more room to expand (or swell) after exiting the cutting zone. In other words, by providing more room upon exiting the cutting zone the workpiece material will either not rub against the flank surface and/or will not rub against the flank surface with as much force as it had in the past for a cutting tool with a smaller clearance angle. The absence of rubbing or a reduction in the force of the rubbing should reduce the abrasive wear on the cutting tool. Test results set forth hereinafter show an increase in tool life for the cutting tools with the greater clearance angle.

In regard to the cutting clearance angles of the blanks, applicant contemplates that these clearance angles may range between about 15 degrees to about 20 degrees with respect to the rake surface of the cutting insert. Applicant also contemplates that the cutting tool substrate may comprise a cemented carbide, and especially a cemented (cobalt) cemented carbide. Applicant also contemplates that the cutting clearance angle may range between about 130 percent and about 190 percent of the disposition angle.

Referring to actual tests, S-G422 style cutting tools in KD100 (PCD cutting tool that has a substrate and a PCD cutting insert) made by Kennametal Inc. of Latrobe, Pa., 15650 USA were used to turn workpieces made of A390 aluminum alloy. The tool holder provided for a 5 degrees positive back rake angle in all cases. The cutting tools had differing primary clearance angles for the cutting inserts as set forth in Table I below.

TABLE I

Test Results for Turning of A390 Aluminum Alloy Using S-G422 style cutting tools in KD100

| Primary Clearance Angle [degrees] | Actual Clearance Angle [degrees] | Average Tool Life [minutes] |
| --- | --- | --- |
| 5 | 0 | 14.9 |
| 11 | 6 | 21.9 |
| 15 | 10 | 32.4 |
| 20 | 15 | 45.0 |

Test conditions were as follows: a speed of 2500 surface feet per minute [0.762 surface meters per minute]; a feed of 0.005 inches per revolution (ipr) [0.13 millimeters per revolution]; a depth of cut of 0.025 inches [0.64 millimeters]; and the turning was done wet. Tool life was determined by measuring the time it took to develop 0.010 inches [0.254 millimeters] maximum flank wear.

It is very apparent that an increase in the actual clearance angle of between about 10 degrees to about 15 degrees resulted in an improvement in the tool life. An increase in the primary clearance angle from 11 degrees to 15 degrees resulted in an increase in tool life of about 48 percent. An increase in the primary clearance angle from 11 degrees to 20 degrees resulted in an increase in tool life of about 105 percent.

It should be appreciated that the cutting tools may be finished such that the rake surface is roughened so as to provide for better chip control. The cutting tool may have flank surfaces that are polished so as to provide for a smoother workpiece surface finish. The cutting tool may include a roughened rake surface and polished flank surfaces so as to provide for better chip control and a smoother workpiece finish.

It should also be appreciated that the specific cutting clearance angle may be different depending upon the specific cutting application. For example, the cutting clearance angle may be less in those applications when cutting edge strength is important. These applications include high feed cutting applications and interrupted cutting applications. The cutting angle may be greater in those applications in which cutting edge strength is not as important. These applications include continuous turning applications and finishing applications.

All patents, patent applications, articles and other documents identified herein are hereby incorporated by reference herein.

Other embodiments of the invention may be apparent to those skilled in the art from a consideration of the specification or the practice of the invention disclosed herein. It is intended that the specification and any examples set forth herein be considered as illustrative only, with the true spirit and scope of the invention being indicated by the following claims.

What is claimed is:

1. A cutting tool for removing material from a workpiece wherein the cutting tool is held in a pocket of a tool holder, the cutting tool comprising:

a cutting tool substrate that has a rake substrate surface and a plurality of flank substrate surfaces, the cutting tool substrate contains a notch, the notch is at the intersection of a pair of adjacent flank substrate surfaces, the substrate has an opposite corner defined by the flank substrate surfaces that are opposite from the notch;

the adjacent flank substrate surfaces are disposed at a substrate clearance angle with respect to the normal to the rake substrate surface and the opposite flank substrate surfaces are disposed at a substrate disposition angle with respect to the normal to the rake substrate surface, and the opposite flank substrate surfaces contact a portion of the tool holder that at least in part defines the pocket;

a cutting blank received within the notch;

the cutting blank has a rake blank surface and a pair of flank blank surfaces, a cutting edge is at the intersection of the rake blank surface and the flank blank surfaces;

the flank blank surfaces are disposed at a cutting clearance angle with respect to the normal to the rake blank surface, and the substrate clearance angle is equal to the cutting clearance angle; and the cutting clearance angle is not equal to the substrate disposition angle.

2. The cutting tool according to claim 1 wherein cutting clearance angle is greater than the substrate disposition angle.

3. The cutting tool according to claim 1 wherein the cutting clearance angle is equal to about 20 degrees and the substrate disposition angle is equal to about 11 degrees.

4. The cutting tool according to claim 1 wherein the cutting clearance angle is equal to about 15 degrees and the substrate disposition angle is equal to about 11 degrees.

5. The cutting tool according to claim 1 wherein the cutting clearance angle is equal to between about 15 degrees and about 20 degrees and the substrate disposition angle is equal to about 11 degrees.

6. The cutting tool according to claim 1 wherein the substrate comprises cemented carbide.

7. The cutting tool according to claim 1 wherein the substrate comprises cobalt cemented tungsten carbide.

8. The cutting tool according to claim 1 wherein the cutting blank comprises polycrystalline diamond.

9. The cutting tool according to claim 1 wherein the cutting blank comprises polycrystalline cubic boron nitride.

10. The cutting tool according to claim 1 wherein the cutting blank comprises CVD diamond sheet.

11. The cutting too according to claim 1 wherein the cutting clearance angle is between about 130 percent and about 190 percent greater than the substrate disposition angle.

12. A cutting tool assembly for removing material from a workpiece, the cutting tool assembly comprising:
- a tool holder containing a pocket wherein a rear surface and a bottom surface define the pocket;
- a cutting tool being received within the pocket of the tool holder;
- the cutting tool comprising:
  - a cutting tool substrate that has a rake substrate surface and a plurality of flank substrate surfaces, the cutting tool substrate contains a notch, the notch is at the intersection of a pair of adjacent flank substrate surfaces, the substrate has an opposite corner defined by flank substrate surfaces that are opposite from the notch;
  - the adjacent flank substrate surfaces are disposed at a substrate clearance angle with respect to the normal to the rake substrate surface and the opposite flank substrate surfaces are disposed at a substrate disposition angle with respect to the normal to the rake substrate surface, and the opposite flank substrate surfaces contact a portion of the tool holder that at least in part defines the pocket;
  - a cutting blank received within the notch;
  - the cutting blank has a rake blank surface and a pair of flank blank surfaces, a cutting edge is at the intersection of the rake blank surface and the flank blank surfaces;
  - the flank blank surfaces are disposed at a cutting clearance angle with respect to the normal to the rake flank surface, the substrate clearance angle is equal to the cutting clearance angle; and
  - the cutting clearance angle is not equal to the substrate disposition angle.

13. The cutting tool according to claim 12 wherein cutting clearance angle is greater than the substrate disposition angle.

14. The cutting tool according to claim 12 wherein the cutting clearance angle is equal to between about 15 degrees and about 20 degrees and the substrate disposition angle is equal to about 11 degrees.

15. The cutting tool according to claim 12 wherein the substrate comprises cemented carbide.

16. The cutting tool according to claim 12 wherein the cutting blank comprises polycrystalline diamond.

17. The cutting tool according to claim 12 wherein the cutting blank comprises polycrystalline cubic boron nitride.

18. The cutting tool according to claim 12 wherein the substrate comprises CVD diamond sheet.

19. The cutting tool according to claim 12 wherein the insert clearance angle is between about 130 percent and about 190 percent greater than the substrate disposition angle.

20. A cutting tool for removing material from a workpiece wherein the cutting tool is held in a pocket of a tool holder, the cutting tool comprising:
- a cutting tool substrate that has a rake substrate surface and a plurality of flank substrate surfaces including a pair of adjacent flank substrate surfaces, each one of the adjacent flank substrate surfaces having a forward portion and a rearward portion, the cutting tool substrate contains a notch at the intersection of the forward portions of the adjacent flank substrate surfaces, and the substrate has an opposite corner defined by opposite flank substrate surfaces that are opposite from the notch;
- the forward portions of the adjacent flank substrate surfaces are disposed at a substrate clearance angle with respect to the normal to the rake substrate surface, and the rearward portions of the adjacent flank substrate surfaces and the opposite flank substrate surfaces are disposed at a disposition angle with respect to the normal to the rake substrate surface;
- a cutting blank is received within the notch;
- the cutting blank has a rake blank surface and a pair of flank blank surfaces, a cutting edge is at the intersection of the rake blank surface and the flank blank surfaces;
- the flank blank surfaces are disposed at a cutting clearance angle with respect to the normal to the rake blank surface, and the substrate clearance angle is equal to the cutting clearance angle; and
- the cutting clearance angle is not equal to the disposition angle.

21. The cutting tool according to claim 20 wherein cutting clearance angle is greater than the disposition angle.

22. The cutting tool according to claim 20 wherein the cutting clearance angle is equal to about 20 degrees and the disposition angle is equal to about 11 degrees.

23. The cutting tool according to claim 20 wherein the cutting clearance angle is equal to about 15 degrees and the disposition angle is equal to about 11 degrees.

24. The cutting tool according to claim 20 wherein the cutting clearance angle is equal to between about 15 degrees and about 20 degrees and the disposition angle is equal to about 11 degrees.

25. The cutting tool according to claim 20 wherein the substrate is cemented carbide.

26. The cutting tool according to claim 20 wherein the cutting blank is selected from the group comprising polycrystalline diamond, polycrystalline cubic boron nitride and CVD diamond sheet.

27. The cutting tool according to claim 20 wherein the cutting clearance angle is between about 130 percent and about 190 percent greater than the e disposition angle.

28. A cutting tool for removing material from a workpiece wherein the cutting tool is held in a pocket of a tool holder, the cutting tool comprising:
- a cutting tool substrate that has a rake substrate surface, adjacent flank substrate surfaces, and an opposite flank substrate surface, each one of the adjacent flank substrate surfaces has a forward portion and a rearward portion, and the cutting tool substrate contains a notch at the intersection of the forward portions of the adjacent flank substrate surfaces;
- the forward portions of the adjacent flank substrate surfaces are disposed at a substrate clearance angle with respect to the normal to the rake substrate surface, and the rearward portions of the adjacent flank substrate surfaces and the opposite flank substrate surface are disposed at a disposition angle with respect to the normal to the rake substrate surface;
- a cutting blank is received within the notch;
- the cutting blank has a rake blank surface and a pair of adjacent flank blank surfaces, a cutting edge is at the intersection of the rake blank surface and at least one of the adjacent flank surfaces;

the flank blank surfaces are disposed at a cutting clearance angle with respect to the normal to the rake blank surface, and the cutting clearance angle is equal to the substrate clearance angle; and the cutting clearance angle is not equal to the disposition angle.

29. The cutting tool according to claim 28 wherein cutting clearance angle is greater than the disposition angle.

30. The cutting tool according to claim 28 wherein the cutting clearance angle is equal to between about 15 degrees and about 20 degrees and the disposition angle is equal to about 11 degrees.

31. The cutting tool according to claim 28 wherein the substrate is cemented carbide.

32. The cutting tool according to claim 28 wherein the cutting insert comprises a material selected from the group consisting of polycrystalline diamond, polycrystalline cubic boron nitride, and CVD diamond sheet.

33. The cutting tool according to claim 28 wherein the cutting clearance angle is between about 130 percent and about 190 percent greater than the disposition angle.

34. A cutting tool for removing material from a workpiece wherein the cutting tool is held in a pocket of a tool holder, the cutting tool comprising:

a cutting tool substrate that has a rake substrate surface, adjacent flank substrate surfaces, and an opposite flank substrate surface, one of the adjacent flank substrate surfaces has a forward portion and a rearward portion, and the cutting tool substrate contains a notch at the intersection of the forward portion of the one adjacent flank substrate surface; and the other adjacent flank substrate surface the forward portion of the one adjacent flank substrate surface is disposed at a substrate clearance angle with respect to the normal to the rake substrate surface;

the rearward portion of the one adjacent flank substrate surface and the other adjacent flank substrate surface and the opposite flank substrate surface are disposed at a disposition angle with respect to the normal to the rake substrate surface;

a cutting blank is received within the notch;

the cutting blank has a rake blank surface and a pair of adjacent flank blank surfaces, a cutting edge is at the intersection of the rake blank surface and one of the adjacent flank surfaces;

the one adjacent flank blank surface is disposed at a cutting clearance angle with respect to the normal to the rake blank surface, and the cutting clearance angle is equal to the substrate clearance angle; and the cutting clearance angle is not equal to the disposition angle.

35. The cutting tool according to claim 34 wherein the other adjacent flank blank surface is disposed at the disposition angle with respect to the normal to the rake blank surface.

36. The cutting tool according to claim 34 wherein cutting clearance angle is greater than the disposition angle.

37. The cutting tool according to claim 34 wherein the cutting clearance angle is equal to between about 15 degrees and about 20 degrees and the disposition angle is equal to about 11 degrees.

38. The cutting tool according to claim 34 wherein the substrate is cemented carbide.

39. The cutting tool according to claim 34 wherein the cutting insert comprises a material selected from the group consisting of: polycrystalline diamond, polycrystalline cubic boron nitride, and CVD diamond sheet.

40. The cutting tool according to claim 34 wherein the cutting clearance angle is between about 130 percent and about 190 percent greater than the disposition angle.

41. A cutting tool for removing material from a workpiece wherein the cutting tool is held in a pocket of a tool holder, the cutting tool comprising:

a cutting tool substrate that has a rake substrate surface, adjacent flank substrate surfaces, and an opposite flank substrate surface, and the cutting tool substrate contains a notch at the intersection of the forward portions of the adjacent flank substrate surfaces;

one of the adjacent flank substrate surfaces is disposed at a substrate clearance angle with respect to the normal to the rake substrate surface, and the other one of the adjacent flank substrate surfaces and the opposite flank substrate surface are disposed at a disposition angle with respect to the normal to the rake substrate surface;

a cutting blank is received within the notch;

the cutting blank has a rake blank surface and a pair of adjacent flank blank surfaces, a cutting edge is at the intersection of the rake blank surface and one of the adjacent flank blank surfaces;

the one flank blank surface is disposed at a cutting clearance angle with respect to the normal to the rake blank surface, and the cutting clearance angle is equal to the substrate clearance angle; and the cutting clearance angle is not equal to the disposition angle.

42. The cutting tool according to claim 41 wherein the other adjacent flank blank surface is disposed at the disposition angle with respect to the normal to the rake blank surface.

43. The cutting tool according to claim 41 wherein cutting clearance angle is greater than the disposition angle.

44. The cutting tool according to claim 41 wherein the cutting clearance angle is equal to between about 15 degrees and about 20 degrees and the disposition angle is equal to about 11 degrees.

45. The cutting tool according to claim 41 wherein the substrate is cemented carbide.

46. The cutting tool according to claim 41 wherein the cutting insert comprises a material selected from the group consisting of: polycrystalline diamond, polycrystalline cubic boron nitride, and CVD diamond sheet.

47. The cutting tool according to claim 41 wherein the cutting clearance angle is between about 130 percent and about 190 percent greater than the disposition angle.

* * * * *